(12) United States Patent
Fujita

(10) Patent No.: US 9,857,673 B2
(45) Date of Patent: Jan. 2, 2018

(54) PROJECTOR

(71) Applicant: Panasonic Intellectual Property Management Co., Ltd., Osaka (JP)

(72) Inventor: Akane Fujita, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/361,207

(22) Filed: Nov. 25, 2016

(65) Prior Publication Data

US 2017/0277033 A1    Sep. 28, 2017

(30) Foreign Application Priority Data

Mar. 25, 2016  (JP) ................................ 2016-062023

(51) Int. Cl.
    *G03B 21/20*    (2006.01)
    *H04N 9/31*     (2006.01)
    *G02B 3/06*     (2006.01)
    *G02B 27/30*    (2006.01)
    *G02B 5/09*     (2006.01)

(52) U.S. Cl.
    CPC .......... *G03B 21/2066* (2013.01); *G02B 3/06* (2013.01); *G02B 5/09* (2013.01); *G02B 27/30* (2013.01); *G03B 21/2013* (2013.01); *G03B 21/2033* (2013.01); *H04N 9/3164* (2013.01)

(58) Field of Classification Search
    CPC ............ G03B 21/2013; G03B 21/2033; G03B 21/2066; G03B 21/208; H04N 9/3152; H04N 9/3161; H04N 9/3164

USPC ................... 362/235, 236, 241, 296.01, 297
    See application file for complete search history.

(56) References Cited

U.S. PATENT DOCUMENTS

2010/0328633 A1   12/2010   Sato et al.
2016/0091785 A1*   3/2016   Inoko ................. G03B 21/2066
                                                                353/31

FOREIGN PATENT DOCUMENTS

JP           2011-13317         1/2011

* cited by examiner

*Primary Examiner* — Ryan Howard
(74) *Attorney, Agent, or Firm* — Wenderoth, Lind & Ponack, L.L.P.

(57) ABSTRACT

A projector includes a light source unit group having light source units arranged in matrix, a mirror group arranged in a traveling direction of light beams emitted from the unit group, the mirror group including reflective mirrors that reflect, with reflective parts, the beams emitted from the unit group while each of the reflective mirrors narrows interval between the beams in a first direction, the mirrors being arranged stepwise so as to narrow interval between the beams in a second direction, and a cylindrical lens arranged in traveling directions of beams reflected by the mirrors, the lens causing the reflected beams reflected by the mirrors and traveling in the traveling directions different from each other to be parallel, the reflective parts being arranged to be bent in steps in the second direction so that the beams to be reflected in the second direction are close to each other.

6 Claims, 7 Drawing Sheets

US 9,857,673 B2

PROJECTOR

BACKGROUND ART

Technical Field

The present disclosure relates to a projector that obtains parallel light beams which are a light flux obtained by narrowing intervals between light beams emitted from a plurality of light sources in a first direction and a second direction into generally parallel light beams by using one mirror group.

Description of the Related Art

Patent Literature 1 discloses narrowing of intervals between a plurality of light beams emitted from a light source group arranged on a plane in each of a row direction and a column direction by using two mirror groups in which strip-shaped mirrors are arranged stepwise.

CITATION LIST

Patent Literature

Patent Literature 1: JP 2011-13317 A

SUMMARY

The present disclosure provides a projector that narrows the interval between the plurality of light beams emitted from the light source unit and the interval between reflective mirrors, achieves downsizing of the projector as a whole, and forms parallel light beams with a configuration of one mirror group.

A projector according to the present disclosure, includes:

a light source unit group in which a plurality of light source units are arranged in matrix;

a mirror group arranged in a traveling direction of a plurality of light beams emitted from the light source unit group, the mirror group comprising a plurality of reflective mirrors that reflect, with reflective parts thereof, the plurality of light beams emitted from the light source unit group while each of the reflective mirrors narrows an interval between the plurality of light beams in a first direction, the reflective mirrors being arranged stepwise so as to narrow an interval between the plurality of light beams in a second direction; and a cylindrical lens arranged in traveling directions of reflected light beams reflected by the reflective mirrors, the cylindrical lens causing the plurality of reflected light beams which are reflected by the reflective mirrors and travel in the traveling directions different from each other to be parallel, wherein the reflective parts of the reflective mirrors are arranged to be bent in a plurality of steps in the second direction so that the light beams to be reflected in the second direction are close to each other.

The projector according to the present disclosure is capable of narrowing the interval between the plurality of light beams emitted from the light source unit and the interval between the reflective mirrors, achieving downsizing of the projector as a whole, and forming parallel light beams with the configuration of one mirror group.

DETAILED DESCRIPTION

Embodiments will be described in detail below with reference to the drawings as needed. However, a description more detailed than necessary may be omitted. For example, a detailed description of already well-known items and a repeated description regarding substantially identical components may be omitted. This is intended to avoid making the following description unnecessarily redundant and to make it easier for a person skilled in the art to understand the embodiment.

It is to be noted that the inventor provides the accompanying drawings and the following description in order for a person skilled in the art to fully understand the present disclosure, and that the inventor does not intend to limit the subject described in the appended claims.

First Embodiment

The first embodiment will be described below with reference to FIG. 1 to FIG. 9.

[1-1. Configuration]

Figure 1:
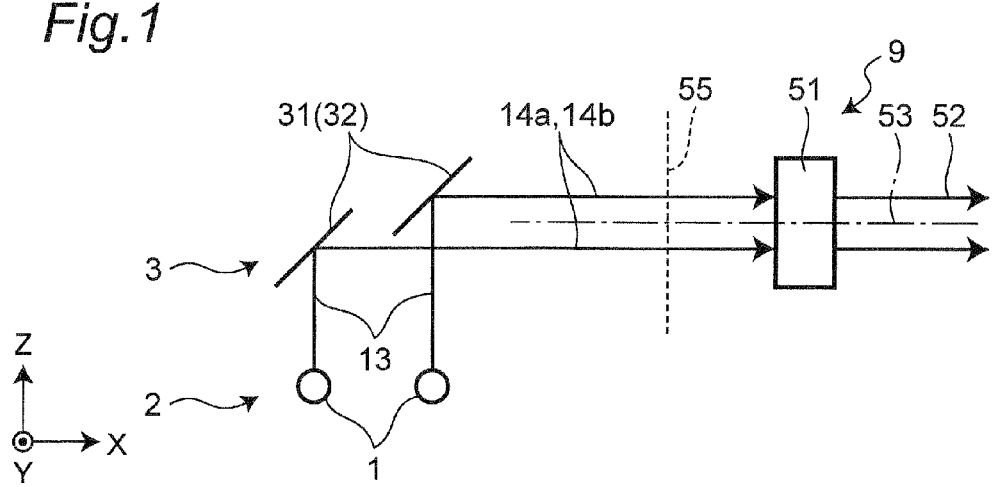
FIG. 1 is a top view of a projector according to a first embodiment.
Figure 2:
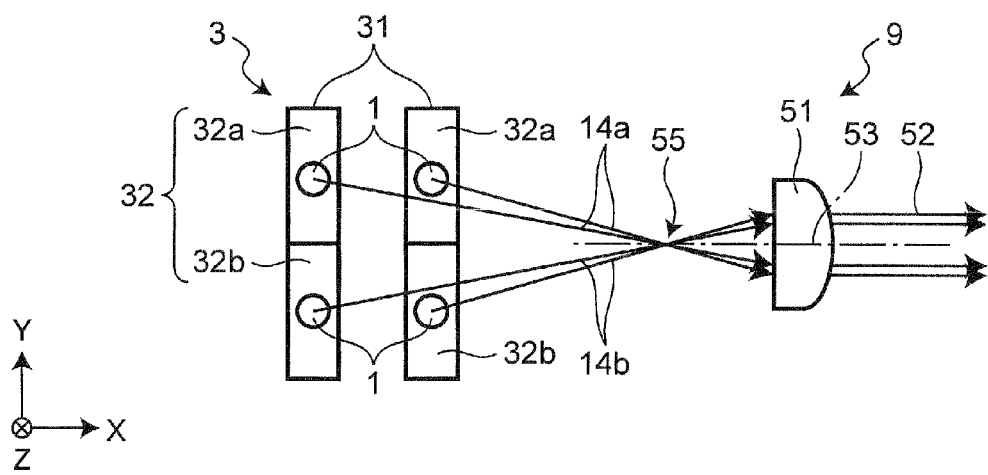
FIG. 2 is a front view of the projector according to the first embodiment.

FIG. 1 is a top view of a projector 9 according to the first embodiment, and FIG. 2 is a front view of the projector 9 according to the first embodiment. The projector 9 includes a light source unit group 2, a single mirror group 3, and a cylindrical lens 51. As illustrated in FIG. 1, the projector 9 narrows the interval between a plurality of light beams 13 emitted from the light source unit group 2 in the Z direction, and emits parallel light beams 52 which are a light flux obtained by making a plurality of reflected light beams 14 generally parallel. Thus, the interval between the plural light beams prior to reflection in the X direction is wider than the interval between the plural light beams in the Z direction after reflection.

[1-1-1. Light Source Unit Group]

In the light source unit group 2, a plurality of light source units 1 is arranged at equal intervals in matrix on an XY plane including the first direction X and the second direction Y. The light source unit group 2 emits the light beams 13 in a third direction Z orthogonal to the XY plane.

Figure 3:
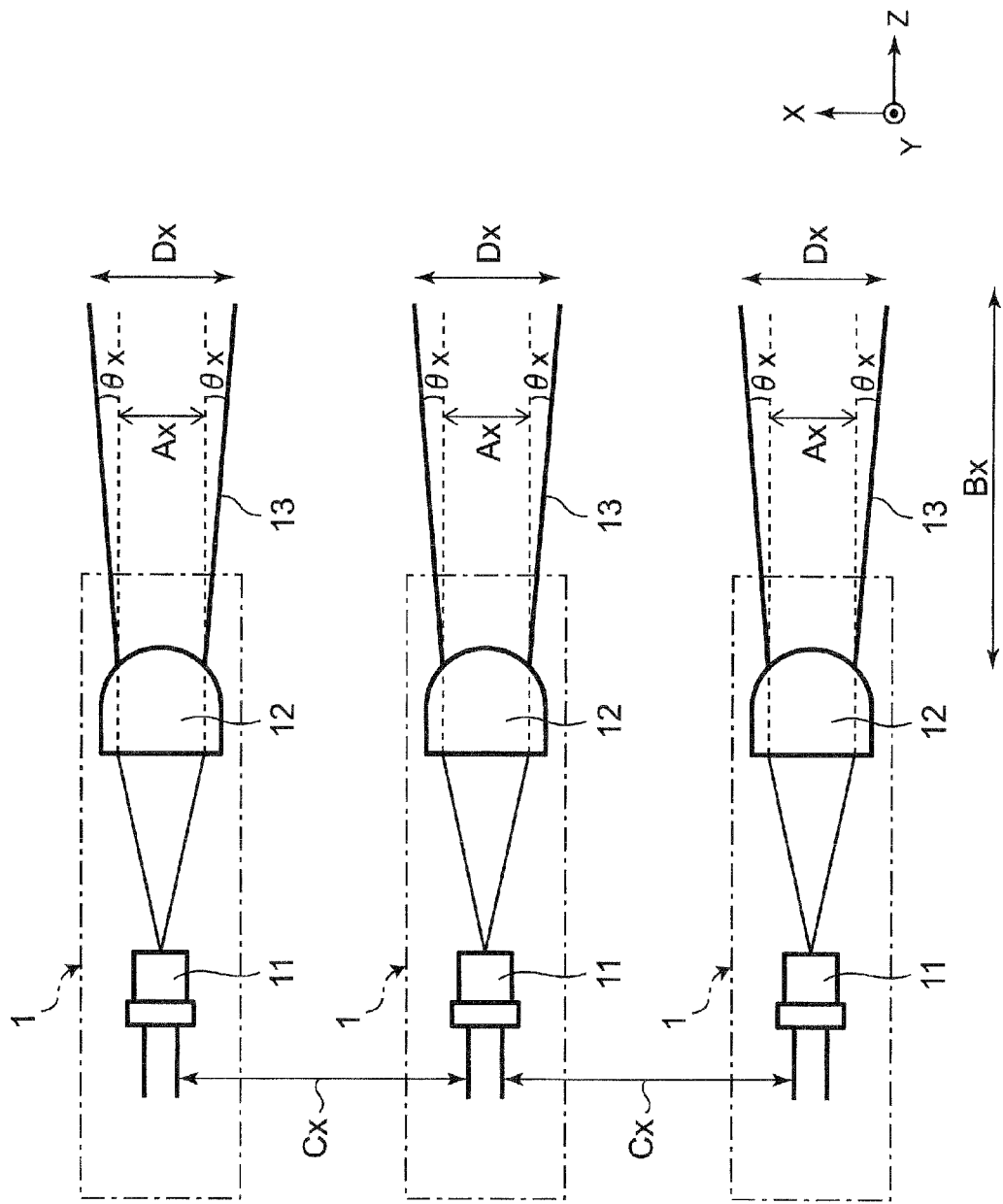
FIG. 3 is an explanatory diagram of adjacent light source units of the projector according to the first embodiment.

Each light source unit 1 includes, for example, a laser light source 11 that emits the light beam 13, and a lens 12 for limiting a divergence angle of the emitted light beam 13 and making the light beam close to a parallel light beam, as illustrated in FIG. 3. A collimator lens can be used for the lens 12 as one example. This lens 12 prevents the light beams 13 adjacent in the first direction X from overlapping each other before the light beam 13 enters the mirror group 3. This will be described below.

The plurality of light source units 1 emits the plurality of light beams 13 in parallel in the third direction Z. Since the light beams 13 diverge at a divergence angle θx, a diameter increases as the light beams 13 travel. Therefore, in order that the light beams 13 are all reflected by the mirror group 3, an interval Cx between the light source units 1 and a size of a reflective mirror 31 need to be designed based on a diameter Dx of the traveled light beam 13.

The diameter Dx of the light beam 13 increases gradually at the divergence angle θx of the light source unit 1. When a distance from the light source unit 1 to the mirror group 3 is assumed to be a distance Bx, the diameter Dx of the light source unit 1 is expressed by Equation 1 from a width Ax of an emission surface and the divergence angle θx. In addition, the diameter Dx of the light source unit 1 needs to satisfy a relationship of Equation 1 with the interval Cx between the light source units 1 in the first direction X.

$$Dx = Ax + 2Bx \times \tan \theta x \quad \text{(Equation 1)}$$

$$Dx < Cx$$

When Equation 1 is satisfied, the adjacent light beams 13 do not overlap before the reflective mirror 31. In addition, the size of the reflective mirror 31 is large enough to reflect the diameter Dx of the light beam 13.

[1-1-2. Mirror Group]

As shown for example in FIG. 2, the mirror group 3 is arranged in a traveling direction of the plurality of light beams 13 emitted from the light source unit group 2, that is, the mirror group intercepts the light that is travelling along the Z direction. In the mirror group 3, a plurality of strip-shaped reflective mirrors 31 that are bent so as to narrow the interval between the plurality of light beams 13 in the second direction Y are arranged stepwise so that each of the reflective mirrors 31 narrows the interval in the Y direction between the light beams 13 as the light beams travel in the X direction. Thus, the interval between the plural light beams prior to reflection in the Y direction is wider than the interval between the plural light beams in the Y direction after reflection.

Figure 4A:
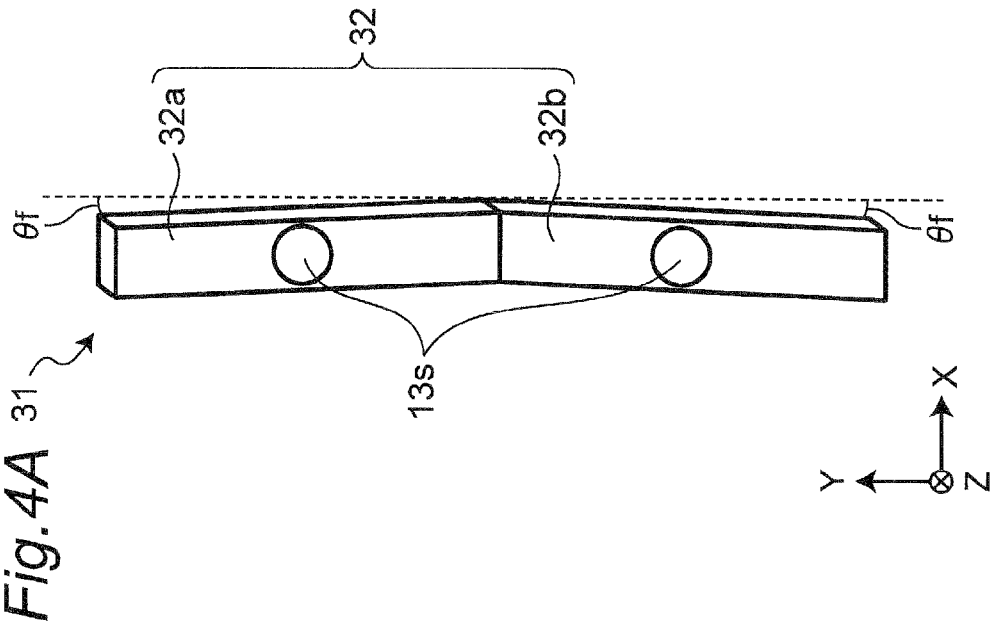
FIG. 4A is a perspective view of a reflective mirror of the projector according to the first embodiment.

As illustrated in FIG. 4A, each reflective mirror 31 is bent in a plurality of steps in the second direction Y so that the interval between the plurality of light beams 13 becomes closer in the second direction Y. As one example, in FIG. 4A, an upper reflective surface 32a and a lower reflective surface 32b are formed by bending two plate-shaped rectangular reflective mirrors 31 in two steps in each center and connecting the reflective mirrors 31 with each other in a bending state. The upper reflective surface 32a and the lower reflective surface 32b function as reflective parts 32 that reflect the light beams 13.

That is, as illustrated in FIG. 4A, as the reflective parts 32 that reflect respective light beams 13, the reflective mirror 31 has the upper reflective surface 32a and the lower reflective surface 32b bent with respect to the upper reflective surface 32a. Each of the upper reflective surface 32a and the lower reflective surface 32b reflects one light beam 13 emitted from one of the light source units 1 different from each other. The upper reflective surface 32a and the lower reflective surface 32b are inclined at a bending angle θf with respect to the second direction Y in a YZ plane. In the two reflective mirrors 31, the upper reflective surfaces 32a are arranged in parallel with each other, and the lower reflective surfaces 32b are also arranged in parallel with each other. In FIG. 4A, a spot 13s is a position at which one light beam 13 enters and is reflected by each of the upper reflective surface 32a and the lower reflective surface 32b. The spot 13s is illustrated as one circular spot.

The bending angle θf of the upper reflective surface 32a and the lower reflective surface 32b of the reflective mirror 31 is set so as to reflect the light beams 13 toward a light collecting point (light collecting position) 55 or the cylindrical lens 51. Here, the bending angle θf refers to an inclination angle of the upper reflective surface 32a with respect to a vertical direction, or an inclination angle of the lower reflective surface 32b with respect to the vertical direction, as illustrated in FIG. 4A.

In FIG. 1 and FIG. 2, four light beams 13 are emitted from four light source units 1 of two rows and two columns of the light source unit group 2 toward two reflective mirrors 31 in the third direction Z orthogonal to the XY plane. As illustrated in FIG. 1, each reflective mirror 31 is arranged at an angle of 45 degrees with respect to the third direction Z. Then, two upper light beams 13 along the third direction Z are reflected rightward in the first direction X by the upper reflective surfaces 32a of two reflective mirrors 31. Then, the two light beams 13 become reflected light beams 14a parallel with each other. In addition, two lower light beams 13 along the third direction Z are reflected rightward in the first direction X by the lower reflective surfaces 32b of two reflective mirrors 31. Then, the two light beams 13 become reflected light beams 14b parallel with each other.

As illustrated in detail in FIG. 1, in an XZ plane viewed from above, since the upper reflective surfaces 32a of the adjacent reflective mirrors 31 are arranged in parallel with each other at an inclination angle of 45 degrees with respect to the third direction Z, the light beams 13 emitted in the third direction Z from the light source units 1 different from each other are reflected by the respective upper reflective surfaces 32a. The reflected light beams 14a enter the cylindrical lens 51 along an optical axis 53 of the cylindrical lens 51 as parallel light beams. Similarly, since the lower reflective surfaces 32b of the adjacent reflective mirrors 31 are arranged in parallel with each other at an inclination angle of 45 degrees with respect to the third direction Z, the light beams 13 emitted in the third direction Z from the light source units 1 different from each other are reflected by the respective lower reflective surfaces 32b. The reflected light beams 14b enter the cylindrical lens 51 as parallel light beams.

Meanwhile, as illustrated in FIG. 2, in the XY plane viewed from front, since the upper reflective surfaces 32a of the adjacent reflective mirrors 31 are arranged in parallel with each other, the light beams 13 emitted in the third direction Z from the light source units 1 different from each other are reflected by the respective upper reflective surfaces 32a. The reflected light beams 14a enter the cylindrical lens 51 as light beams parallel with each other at a certain inclination angle with respect to the optical axis 53 of the cylindrical lens 51. Similarly, since the lower reflective surfaces 32b of the adjacent reflective mirrors 31 are arranged in parallel with each other, the light beams 13 emitted in the third direction Z from the light source units 1 different from each other are reflected by the respective lower reflective surfaces 32b. The reflected light beams 14b enter the cylindrical lens 51 as light beams parallel with each other at a certain inclination angle with respect to the optical axis 53 of the cylindrical lens 51.

A specific example of a numerical value of the bending angle is a value in a range larger than 0° and smaller than 45°, and a more specific example is a value between 10° and 30°.

For comparison, considering a case where the mirror group 3 does not include the plurality of stepwise reflective mirrors 31 but includes a reflective mirror having one curved reflective surface. In this case, when the light beams 13 from the light source units 1 are reflected by the curved reflective surface and then collected at the cylindrical lens 51, all the reflected light beams have some inclination angles with respect to the optical axis of the cylindrical lens 51 in both the first direction and the second direction, making it difficult to form uniform parallel light beams along the optical axis in both directions of the first direction X and the second direction Y.

In contrast, in the first embodiment, since the upper reflective surface 32a and the lower reflective surface 32b of each reflective mirror 31 are arranged at an angle of 45 degrees with respect to the third direction Z, parallel light beams along the optical axis of the cylindrical lens 51 are formed in one direction of the first direction X and the second direction Y of the reflective mirror 31 (for example, the first direction X of FIG. 1). Therefore, the projector 9 can cause the light beams 13 from the light source units 1 to be reflected as they are, for example, by the upper reflective surface 32a or lower reflective surface 32b of the reflective part 32, and to enter the cylindrical lens 51 as parallel light beams.

As illustrated in FIG. 2, since the reflected light beams 14 are reflected by the upper reflective surface 32a and the lower reflective surface 32b which are inclined at the bending angle θf with respect to the second direction Y toward the cylindrical lens 51, the reflected light beams 14 enter the cylindrical lens 51 at an inclination angle with respect to the optical axis to make parallel light beams by using the cylindrical lens 51. Therefore, the first embodiment can form the parallel light beams 52 parallel in both directions of the first direction X and the second direction Y.

Figure 4B:
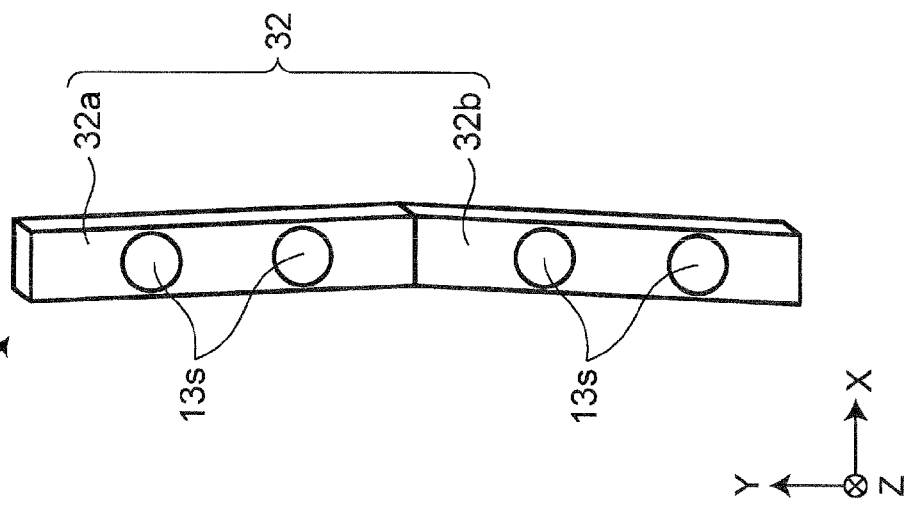
FIG. 4B is an explanatory diagram illustrating a state where the reflective mirror of the projector reflects light beams emitted from the light source unit according to a variation of the first embodiment.

Here, not only one light beam 13 but the plurality of light beams 13 may be reflected by each reflective part 32. For example, as illustrated in FIG. 4B, the reflective mirror 31 may have the upper reflective surface 32a and the lower reflective surface 32b which are inclined at the bending angle θf with respect to the second direction Y as the reflective parts 32 that each reflect the light beams 13. The upper reflective surface 32a and the lower reflective surface 32b may be arranged such that one of the upper reflective surface 32a and the lower reflective surface 32b may simultaneously reflect two light beams 13 emitted from two light source units 1 different from each other. FIG. 4B illustrates positions where two light beams 13 enter each of the upper reflective surface 32a and the lower reflective surface 32b as two circular spots 13s.

Thus, in the strip-shaped reflective mirror 31, by selectively bending the reflective parts 32 irradiated with the light beams 13 from the light source units 1, the interval between the light beams 13 in the first direction X can be narrowed. In addition, since the plurality of reflective mirrors 31 are arranged stepwise in the mirror group 3, the interval between the light beams 13 in the first direction X can be narrowed. Accordingly, the single mirror group 3 can narrow the interval in the first direction X and the interval in the second direction Y simultaneously. Here, a desired optical diameter in the parallel light beam 52 described later can be obtained by adjusting the bending angle θf or the arrangement interval of the reflective mirror 31.

[1-1-3. Cylindrical Lens]

In FIG. 1 and FIG. 2, one cylindrical lens 51 is arranged in the traveling direction of the reflected light beams 14 reflected by the reflective mirrors 31 (in the first direction X), and moreover, the optical axis is arranged along the first direction X. The cylindrical lens 51 has a rectangular cross section in the XZ plane, and has a curved cross section in the traveling direction of the reflected light beams 14 in the XY plane. Therefore, the cylindrical lens 51 can make the plurality of reflected light beams 14 that is reflected by the reflective mirrors 31 and then travels in the traveling directions different from each other (in directions inclined with respect to the first direction X in FIG. 2) parallel with each other, and can make the parallel light beams 52 which are a flux of the plurality of reflected light beams 14.

Figure 5:
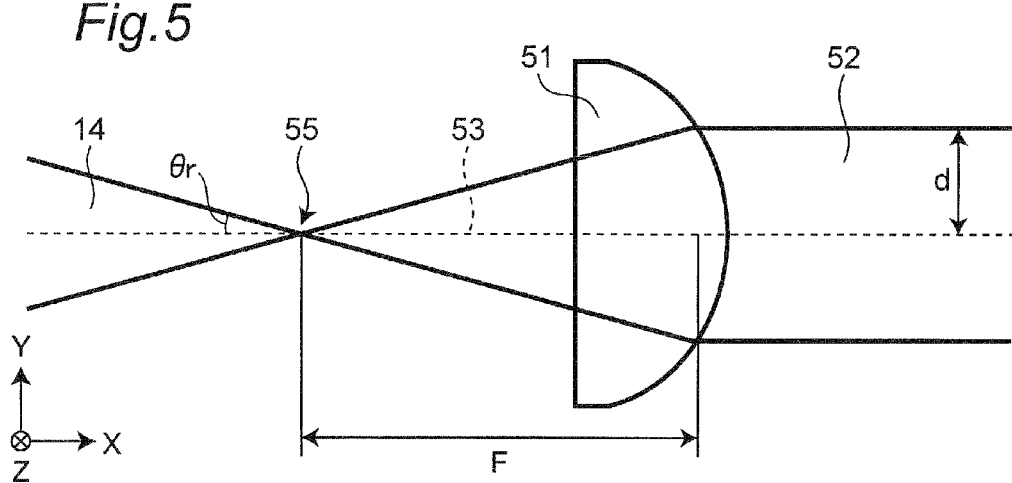
FIG. 5 is an arrangement diagram of a cylindrical lens of the projector according to the first embodiment.

As illustrated in FIG. 5, the cylindrical lens 51 is arranged at a position distant from the light collecting position 55 of the reflected light beams 14 reflected by the mirror group 3 by a focal length F of the cylindrical lens 51. Here, when an inclination angle of the reflected light beams 14 with respect to the optical axis 53 is θr and a radius of the parallel light beams 52 is d, a relationship of Equation 2 holds true.

$$\tan \theta r = d/F \qquad \text{(Equation 2)}$$

Thus, the inclination angle θr is adjusted by setting the bending angle θf of each reflective part 32 so that the reflected light beam 14 from each reflective part 32 of each reflective mirror 31 is collected at the light collecting position 55 on an incidence side of the cylindrical lens 51. Such a configuration allows the reflected light beams 14 to be collected at the light collecting position 55 by adjusting the bending angle θf of the reflective part 32, and allows the cylindrical lens 51 to form the parallel light beams 52 with a necessary radius d.

The number of cylindrical lenses 51 is not limited to one. Two or more cylindrical lenses 51 may be arranged as described in the following example of arrangement as a variation of the first embodiment.

[1-1-4. Arrangement]

The following describes a more specific example of arrangement of the projector 9.

Figure 6A:
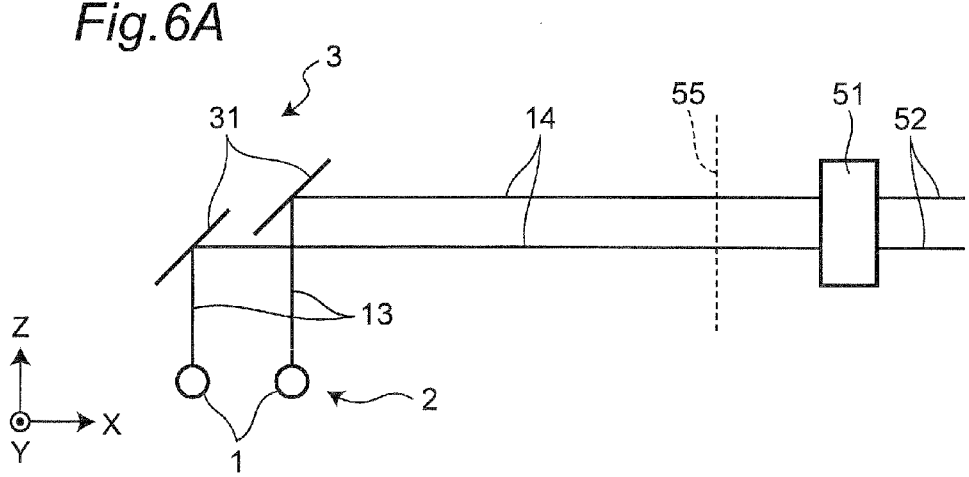
FIG. 6A is a plan view in which the light source units are arranged in three rows and two columns in the projector according to the first embodiment.
Figure 6B:
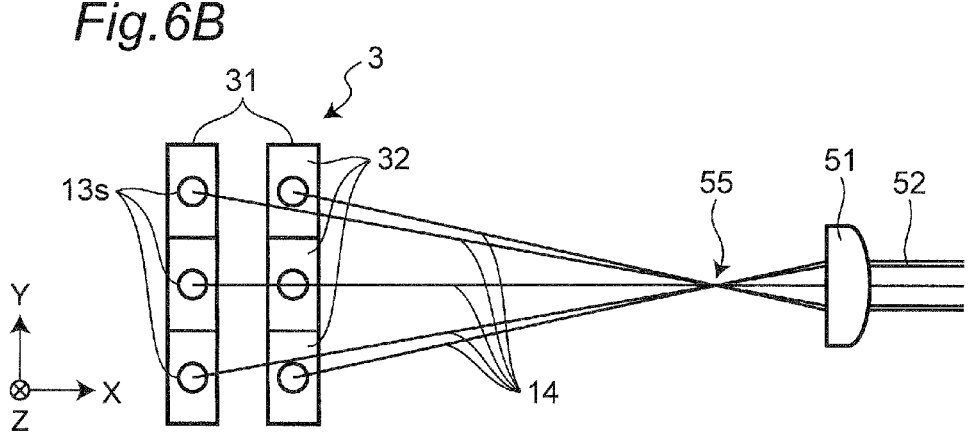
FIG. 6B is a front view in which the light source units are arranged in three rows and two columns in the projector according to the first embodiment.

First, as illustrated in FIG. 6A and FIG. 6B, when the light source units 1 are arranged in three rows and two columns, the reflected light beams 14 reflected by the three reflective parts 32 of each of the two reflective mirrors 31 all pass the light collecting position 55. The reflected light beams 14 are then collected at the one cylindrical lens 51 positioned on a front side of the traveling direction, and become the parallel light beams 52. The reflective part 32 in the center of each reflective mirror 31 is arranged along the optical axis 53 of the cylindrical lens 51 in the Y direction, and θr is 0 degrees.

Figure 7A:
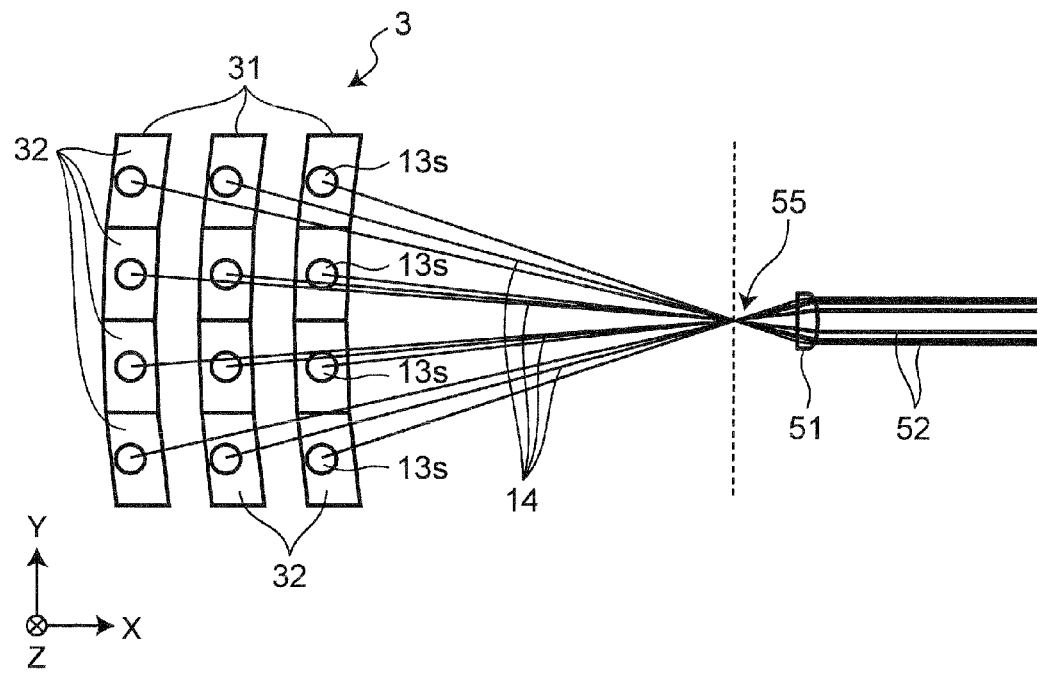
FIG. 7A is a front view in which the light source units are arranged in four rows and three columns in the projector according to the first embodiment.
Figure 7B:
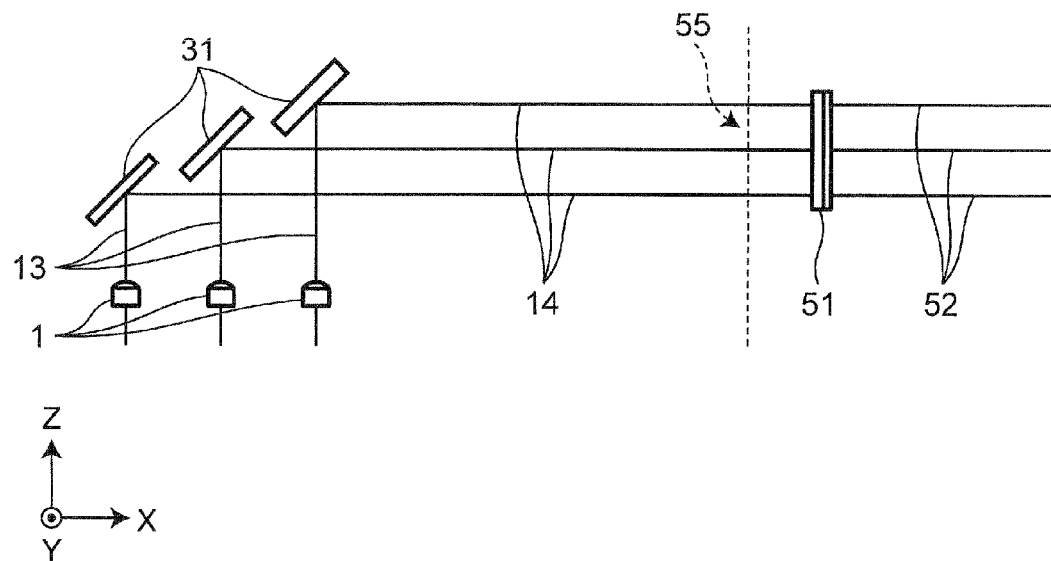
FIG. 7B is a plan view in which the light source units are arranged in four rows and three columns in the projector according to the first embodiment.

Also, as illustrated in FIG. 7A and FIG. 7B, when the light source units 1 are arranged in four rows and three columns, the reflected light beams 14 reflected by the four reflective parts 32 of each of the three reflective mirrors 31 all pass the one light collecting position 55. The reflected light beams 14 are then collected at the one cylindrical lens 51 positioned on a front side of the traveling direction, and become the parallel light beams 52. In other words, the three reflective mirrors 31 are arranged for the one cylindrical lens 51, the four reflective parts 32 of each of the reflective mirrors 31 with different distances from the one cylindrical lens 51 have the bending angles θf different from each other. The bending angle θf for each reflective part 32 is determined so as to collect light beams at the light collecting position 55 on an identical axis.

FIG. 7B illustrates a schematic plan view of the projector viewed from a plane that passes through the uppermost or lowermost reflective part 32 of the four reflective parts 32 of the reflective mirrors 31 of FIG. 7A. In FIG. 7B, since the three reflective mirrors 31 differ in distance from the one cylindrical lens 51, the bending angles θf of the three reflective mirrors 31 with respect to the one cylindrical lens 51 differ. For example, as compared with the reflective mirror 31 far from the cylindrical lens 51, the reflective mirror 31 close to the cylindrical lens 51 has large inclination from the vertical direction to have large bending angle θf, and thus has a large thickness of the reflective part 32.

Thus, the bending angles θf of the plurality of reflective mirrors 31 with different distances from the one cylindrical lens 51 are configured different from each other. Accordingly, the light beams 13 from all the light source units 1 can be reflected and collected toward the light collecting position 55 at angles different from each other by the reflective parts 32 of the plurality of reflective mirrors 31, and then the light beams 13 can enter the one cylindrical lens 51 and become parallel light beams. Such an example of arrangement, which needs only one cylindrical lens 51, can simplify the configuration of the projector as a whole.

Figure 8A:
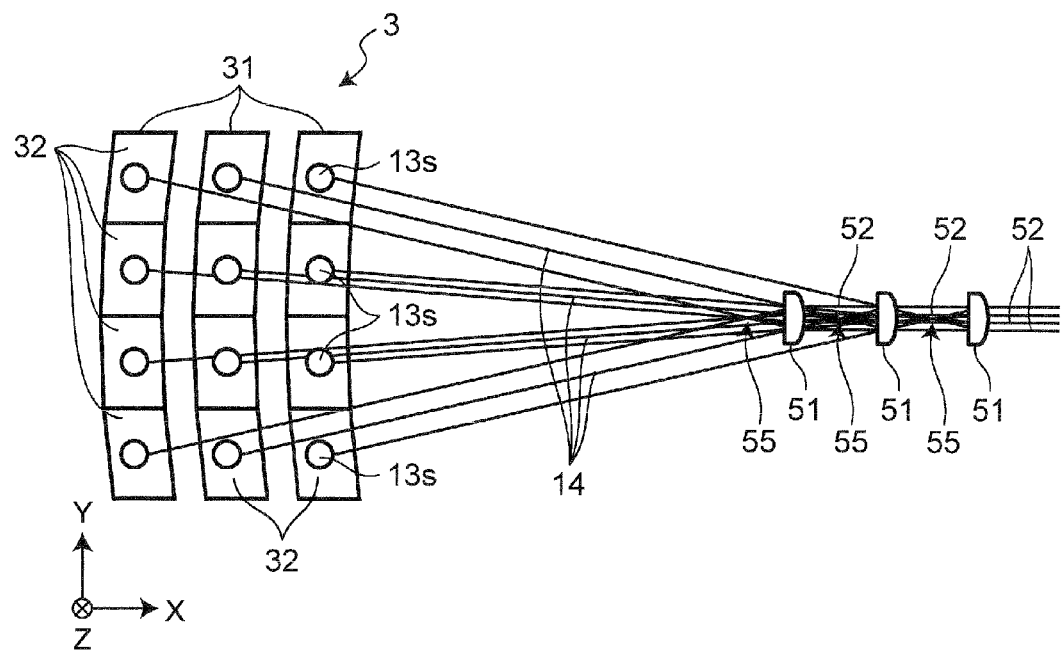
FIG. 8A is a front view in which the light source units are arranged in four rows and three columns in the projector according to the variation of the first embodiment.
Figure 8B:
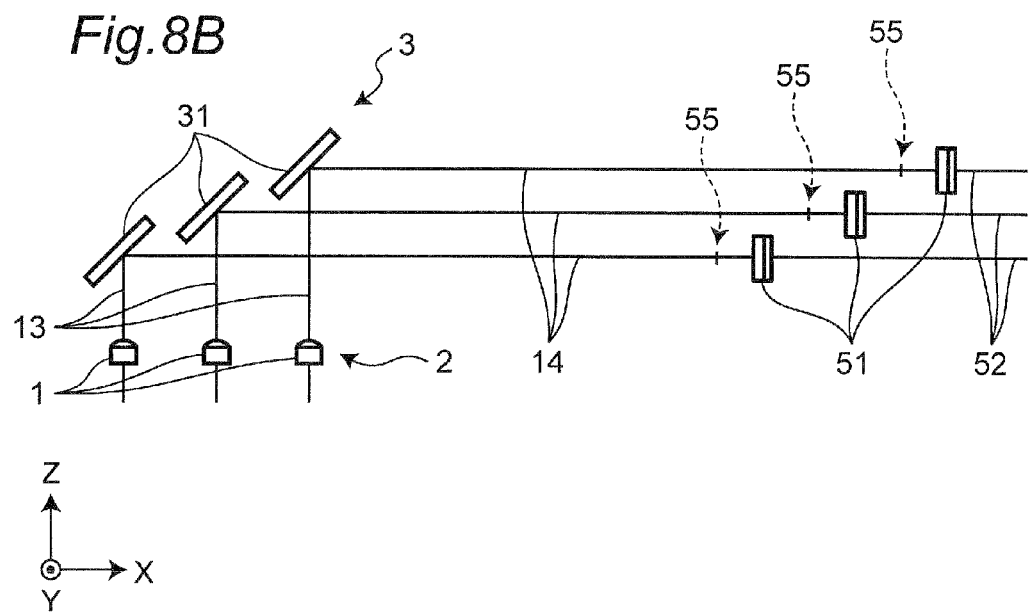
FIG. 8B is a plan view in which the light source units are arranged in four rows and three columns in the projector according to the variation of the first embodiment.

In contrast, as illustrated in FIG. 8A and FIG. 8B, when the light source units 1 are arranged in four rows and three columns, the reflected light beams 14 reflected by the four reflective parts 32 of each of the three reflective mirrors 31 pass the respective light collecting positions 55, enter three cylindrical lenses 51 in total each positioned on a front side of the traveling direction, and become the parallel light beams 52. In other words, FIG. 8A and FIG. 8B illustrate an example in which one cylindrical lens 51 is arranged for each of the three reflective mirrors 31, the reflective parts 32 of the reflective mirrors 31 at the positions with identical distance from each cylindrical lens 51 have the identical bending angle θf so that the reflected light beams 14 are not collected at one light collecting position 55 on an identical axis. In this example, one reflective mirror 31 and one cylindrical lens 51 are considered as one set, and three sets are arranged on the optical axis with displacement by a predetermined distance. Therefore, the bending angles θf of the reflective parts 32 of each of the three reflective mirrors 31 are identical.

Thus, when the plurality of reflective mirrors 31 are arranged such that the bending angles θf of the reflective parts 32 of the reflective mirrors 31 are identical to each other, the cylindrical lens 51 corresponding to each reflective mirror 31 may be arranged individually. Such an example of arrangement, in which the bending angles θf of the reflective parts 32 of the plurality of reflective mirrors 31 are all identical to each other, can simplify the configuration and arrangement of the reflective mirrors 31.

Figure 9:
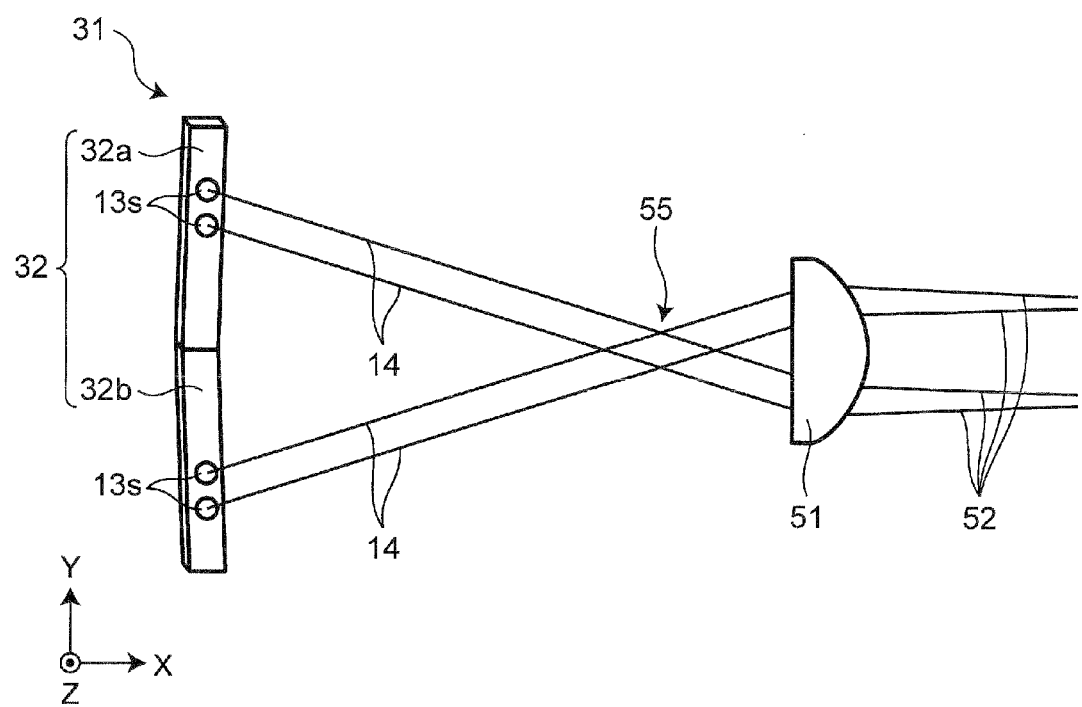
FIG. 9 is a front view in which two light beams are reflected by each reflective part of the reflective mirror in the projector according to the variation of the first embodiment.

In addition, the present disclosure is not limited to the example in which one reflective part 32 reflects one light beam 13 from the light source unit 1. The following illustrates an example of arrangement in which one reflective part 32 reflects two light beams 13 from the light source unit 1. As illustrated in FIG. 9, the projector is configured such that, when the light source units 1 are not arranged at equal intervals and a part of the light source units 1, for example, two light source units 1 which are vertically adjacent are closely arranged, one reflective part 32 of the reflective mirror 31 reflects two light beams 13 from the closely arranged two light source units 1. That is, the arrangement of the reflective mirrors 31 to cause one reflective part 32 of each reflective mirror 31 to reflect the light beams 13 from the plurality of light source units 1 allows reduction in the number of reflective parts 32 for the light source units 1, achievement of downsizing of the projector as a whole, and cost reduction.

[1-2. Operation]

The projector 9 configured as described above emits the light beams 13 from the respective light source units 1 of the light source unit group 2 in the third direction Z, as illustrated in FIG. 1 to FIG. 2. The plurality of emitted light beams 13 are reflected 90 degrees by the reflective parts 32 of the reflective mirrors 31 of the mirror group 3 in the first direction X as the reflected light beams 14. The cylindrical lens 51 converts the reflected light beams 14 into the parallel light beams 52, which are emitted as image light of the projector 9.

Here, the projector 9 does not emit one linear light beam collected at one point, but emits parallel light beams with which a certain predetermined region is irradiated uniformly, for example, a predetermined shape such as a circular or quadrangular shape. Therefore, the projector 9 needs to form and emit parallel light beams of uniform quantity in a certain region, that is, certain vertical and horizontal sizes, and can achieve this with a simple configuration.

[1-3. Effects, Etc.]

As described above, in the present embodiment, the mirror group 3 is arranged in the traveling direction of the plurality of light beams 13 emitted from the light source unit group 2. The plurality of reflective mirrors 31 is arranged stepwise so that each of the reflective mirrors 31 narrows the interval between the plurality of light beams 13 in the first direction X. The plurality of reflective mirrors 31 reflects, with the reflective parts 32, the plurality of light beams 13 emitted from the light source unit group 2 while narrowing the interval between the plurality of light beams 13 in the second direction Y. Such a configuration with the one mirror group 3 makes it possible to narrow both the interval between the plurality of light beams 13 emitted from the light source units 1 and the interval between the reflective mirrors 31 in the first direction X and the second direction Y, to achieve downsizing of the projector as a whole, and to form the parallel light beams 52. That is, the projector 9, which includes the one mirror group 3 instead of a plurality of mirror groups, can have a small configuration as a whole.

In addition, since the reflected light beams 14 reflected by the reflective mirrors 31 are collected only in the second direction Y, after reflection by the mirror group 3, the parallel light beams 52 can be securely obtained by using the cylindrical lens 51. After the parallel light beams 52 are obtained with the cylindrical lens 51, for example, the parallel light beams 52 are collected through an unillustrated phosphor light collecting lens, and a phosphor can be irradiated therewith. As a result, since the mirror group 3 collects the light beams 13 from respective light source units 1, the phosphor light collecting lens can have a small diameter.

Other Embodiments

As described above, the first embodiment has been described as exemplification of the technique to be disclosed in this application. The technique in the present disclosure however is not limited to this example, and may be applied to embodiments to which changes, replacements, additions, and omissions have been made appropriately. In addition, it is also possible to make a new embodiment by combining components described in the aforementioned first embodiment.

As described above, the embodiments have been described as exemplification of the technique in the present disclosure. For this purpose, the accompanying drawings and detailed description have been provided.

Accordingly, the components described in the accompanying drawings and detailed description may include not only components essential for solving problems but also components unessential for solving the problems, in order to illustrate the technique. Therefore, it should not be acknowledged immediately that those unessential components be essential because those unessential components are described in the accompanying drawings and detailed description.

In addition, since the aforementioned embodiments are intended to illustrate the technique in the present disclosure, various changes, replacements, additions, omissions, etc. may be made within the scope of the appended claims or equivalents thereof. Suitable combination of arbitrary embodiments or variations among the various embodiments or variations can provide effect of each embodiment or variation. In addition, while combination of embodiments, combination of examples, or combination of embodiment and example is possible, combination of features in different embodiments or examples is also possible.

The present disclosure is applicable to the projector capable of narrowing the interval between the plurality of light beams emitted from the light source units and the interval between the mirrors, achieving downsizing of the projector as a whole, and forming parallel light beams with the configuration of one mirror group. Specifically, the present disclosure is applicable to downsizing of a high-luminance, high-resolution projector and the like.

What is claimed is:

1. A projector comprising:
   a light source unit group in which a plurality of light source units are arranged in matrix;
   a mirror group arranged in a traveling direction of a plurality of light beams emitted from the light source unit group, the mirror group comprising a plurality of reflective mirrors that reflect, with reflective parts thereof, the plurality of light beams emitted from the light source unit group while each of the reflective mirrors narrows an interval between the plurality of light beams in a first direction, the reflective mirrors being arranged stepwise so as to narrow an interval between the plurality of light beams in the first direction; and
   a cylindrical lens arranged in traveling directions of reflected light beams reflected by the reflective mirrors, the cylindrical lens causing the plurality of reflected light beams which are reflected by the reflective mirrors and travel in the traveling directions different from each other to be parallel,
   wherein the reflective parts of the reflective mirrors are arranged to be bent in a plurality of steps in a second direction so that the light beams to be reflected in the second direction are close to each other.

2. The projector according to claim 1, wherein each of the reflective mirrors comprises a plurality of planes in which the reflective parts that reflect the light beams are connected to each other in a bending state.

3. The projector according to claim 1, wherein bending angles of the reflective parts are set so that the reflected light beams from the reflective parts are collected at a light collecting position on an incidence side of the cylindrical lens.

4. The projector according to claim 1, wherein a number of the cylindrical lens is one, and the reflective mirrors are arranged so that bending angles of the reflective parts of the reflective mirrors with different distances from the cylindrical lens differ from each other.

5. The projector according to claim 1, wherein all bending angles of the reflective parts are identical to each other.

6. The projector according to claim 1, wherein the reflective mirrors are arranged so that one of the reflective parts of each of the reflective mirrors reflects the light beams from multiple light source units of the plurality of light source units.

* * * * *